United States Patent [19]

Shelton

[11] 4,022,625

[45] May 10, 1977

[54] POLISHING COMPOSITION AND METHOD OF POLISHING

[75] Inventor: William A. Shelton, Houston, Tex.

[73] Assignee: NL Industries, Inc., New York, N.Y.

[22] Filed: Dec. 24, 1974

[21] Appl. No.: 536,163

[52] U.S. Cl. .................................. 106/3; 51/309 R; 106/73.3; 106/286; 106/299

[51] Int. Cl.² .......................................... C09G 1/02

[58] Field of Search ............... 51/307, 308, 309; 106/3, 73.3, 286, 299, 292; 204/32 R, 32 S

[56] References Cited

UNITED STATES PATENTS

| | | | |
|---|---|---|---|
| 2,535,526 | 12/1950 | Ballard | 51/309 X |
| 2,653,107 | 9/1953 | Blumenthal | 51/309 X |
| 2,877,104 | 3/1959 | Robie | 51/309 X |
| 2,996,369 | 8/1961 | Harris et al. | 51/309 |
| 3,222,148 | 12/1965 | Hay | 51/309 |
| 3,429,080 | 2/1969 | Lachapelle | 51/309 |
| 3,485,608 | 12/1969 | Cecil | 51/308 |
| 3,870,787 | 3/1975 | Blumenthal | 106/299 X |

*Primary Examiner*—J. Ziegler

[57] ABSTRACT

A polishing composition suitable for polishing semiconductive materials, e.g. silicon and germanium, comprises an aqueous slurry containing as a polishing agent a finely divided calcium-titanium-zirconium-oxygen product having the empirical formula $CaTiZr_3O_9$. Additional materials that may be present include sodium hypochlorite, sodium metasilicate, potassium hydroxide, and glycerine.

9 Claims, No Drawings

POLISHING COMPOSITION AND METHOD OF POLISHING

BACKGROUND OF THE INVENTION

The invention of the present application is concerned with polishing compositions, and particularly relates to such compositions, suitable for the polishing of semiconductive materials, e.g. silicon and germanium, which contain as a polishing agent a novel cmpound of calcium, titanium, zirconium and oxygen hereinafter described.

Slices or wafers cut from single-crystal ingots of semiconductors such as silicon and germanium are widely used in the manufacture of transistors and similar solid state devices. It is important in such use that the semiconductor surface have a mirror finish and be plane and free from scratches, pits and other defects. Consequently, after the wafers are cut from the boules or ingots, they are polished, with or without preliminary grinding, etching, or lapping. Not only is polishing necessary to obtain the desired surface, but it is also required to make the opposite, flat surfaces of the wafers parallel.

Preliminary grinding or lapping of the wafers, when employed, is usually carried out with an abrasive slurry containing fine alumina, silicon carbide, or diamond abrasive. Hitherto, the polishing compositions most generally used have comprised aqueous slurries of polishing agents such as cerium oxide, ferric oxide, zirconium dioxide, and silicon dioxide, The slurry is applied to the surface of the semi-conductor wafers and a cloth polishing pad is employed. Obviously, the particle size of the polishing agents employed must be controlled and all particles large enough to produce scratches must be elimated. The effectiveness of a polishing composition is determined both by the perfection of the surface characteristics resulting from its use and by the polishing time required to obtain a desired or acceptable finish.

The polishing time required with a polishing composition depends largely upon (a) the physical characteristics of the polishing agent, particularly its hardness and particle size; (b) the concentration of the polishing agent in the composition; and (c) the presence of absence of certain other ingredients in the composition. In general, the polishing rate, i.e. the rate at which the scratches are removed and a mirror-like surface is obtained, is higher with harder polishing agents, with increased particle size thereof, and with higher concentrations of polishing agent in the slurry. However, increased hardness of the polishing agent and large particles thereof are likely to present problems with scratching of the surface and increasing the concentration of the agent in the composition may reduce the viscosity of the latter sufficiently to cause difficulty in feeding it evenly. As a result, other ingredients are often added to the compositions to increase the polishing rate.

As an example, it is disclosed in U.S. Pat. No. 3,429,080, granted Feb. 25, 1969, that oxidizing compounds such as hydrogen peroxide, sodium peroxide, potassium permanganate, and sodium hypochlorite, when incorporated in small amount in polishing compositions, materially increase the polishing rate of certain polishing agents.

THE INVENTION

It has been found that compounds having the empirical formula $CaTiZr_3O_9$ are, when in finely divided form, very good polishing agents for semi-conductors. Such calcium-titanium-zirconium-oxygen compounds are obtainable by calcination of suitable oxygen-containing compounds of the three metals. Such products and the production thereof are described in copending application for U.S. Pat. Ser. No. 413,178, filed Nov. 5, 1973, now U.S. Pat. No. 3,870,789, granted Mar. 11, 1975. For convenience, the above-mentioned products will hereinafter be referred to as "caltizir products".

As indicated hereinafter a variety of polishing compositions containing caltizir products can be made. The following example described a polishing composition which has an acceptable polishing rate.

EXAMPLE 1

A polishing composition consisting of:
561.6 g finely divided caltizir product ($-5\mu$ particle size)
203.0 g of 18.3% aqueous solution of NaOCl
32.1 g sodium metasilicate
9.0 g KOH
850.0 g $H_2O$ was prepared by adding the caltizir product to a solution containing the other ingredients and stirring to form a slurry with a pH of 12.5.

The composition was used as hereinafter described in polishing silicon wafers. After polishing for 1 hour, it was found that the average stock removal per wafer was 0.0127 mm. The wafer surfaces were mirror finished and showed no pits.

The caltizir product used in Example 1 was essentially like the product of Example 1 of the said copending patent application. In the following examples the caltizir product employed was essentially like the product of Example 2 of the said application.

EXAMPLE 2

A polishing composition consisting of:
1400.0 g finely divided caltizir product ($-5\mu$ particle size)
545.0 g of 14.7% aqueous solution of NaOCl
22.4 g of KOH
2032.6 g $H_2O$ was prepared by mixing the last three ingredients and then stirring in the caltizir product to form a slurry which had a pH of 12.8.

The composition was used in polishing silicon wafers in the manner hereinafter described and was found to produce an average stock removal of 0.0249 mm per wafer in 1 hour of polishing time. The resulting silicon surfaces showed pits and were all mirror finished.

EXAMPLE 3

A polishing composition consisting of:
700.0 g finely divided caltizir product ($-5\mu$ particle size)
267.0 g of 15% aqueous solution of NaOCl
11.2 g KOH
100.0 g glycerine
922.0 g $H_2O$ was prepared by mixing the last four ingredients and forming a slurry by stirring the caltizir product into the mixture. The composition had a pH of 12.5.

When tested on silicon wafers the polishing composition was found to produce an average stock removal per wafer during a 1 hour period of 0.0203 mm. The wafer surfaces after polishing were free from pitting and had mirror finishes.

EXAMPLE 4

A polishing composition consisting of:
1400.0 g finely divided caltizir product ($-5\mu$ particle size)
545.0 g of 15% aqueous solution of NaOCl
22.4 g KOH
200.0 g glycerine
1832.6 g $H_2O$
was prepared in the same manner as the composition of Example 3. The pH of the slurry was 12.5.

When tested on silicon wafers this polishing composition produced an average stock removal per wafer of 0.0218 mm per hour. All surfaces had a mirror finish and there was no pitting.

EXAMPLE 5

A polishing composition was made from:
1400.0 g finely divided caltizir product ($-5\mu$ particle size)
545.0 g of 14.7% aqueous solution of NaOCl
22.4 g KOH
2.8 g sodium metasilicate
200.0 g glycerine
1829.8 g $H_2O$
by mixing together the last five ingredients to form a solution and then adding the caltizir product to form a slurry, the pH of which was 12.6.

This composition was used to polish silicon wafers and produced a mirror finish with no pitting. The stock removal average per wafer was 0.0213 mm per hour.

EXAMPLE 6

A polishing composition consisting of:
1400.0 g finely divided caltizir product ($-5\mu$ particle size)
875.0 g of 21.95% aqueous solution of NaOCl
22.4 g KOH
80.5 g sodium metasilicate
1612.1 g $H_2O$
was formed by stirring the caltizir product polishing agent into the solution formed by mixing together the other ingredients. The pH of the slurry thus formed was 12.7.

When the polishing composition was tested in polishing silicon wafers there was an average stock removal per wafer of 0.0203 mm per hour and a mirror finish with no pitting was obtained.

EXAMPLE 7

A polishing composition composed of:
1400.0 g finely divided caltizir product ($-5\mu$ particle size)
410.9 g of 19.47% aqueous solution of NaOCL;
22.4 g KOH
80.0 g sodium metasilicate
2086.7 g $H_2O$
was mixed in the same manner as the composition of Example 6 to obtain a slurry having a pH of 12.9.

The composition was tested with silicon wafers and found to have an average stock removal per wafer in a 1 hour period of 0.0203 mm. The polished wafers showed no pitting and had mirror finished surfaces.

The silicon wafers used in the polishing test described above had been sawn from silicon crystals and lapped with $Al_2O_3$ abrasive to obtain substantially parallel faces and to reduce the surface roughness to approximately $5\times10^{-5}$ to $25\times10^{-5}$ mm. The wafers or slices were approximately 25.4 mm in diameter and about 0.25 mm thick. Five slices, after careful determination of thickness, were mounted on the pressure plate of a planetary type polishing machine adjusted to provide a pressure of about 1.40 g/mm$^2$ on the slice surface. Polishing was then carried out for one hour at a speed of about 60 RPM using a Geoscience Politex polishing pad and with an average slurry flow rate to the pad of 10.8 ml/min. After polishing, the wafer thickness was measured with a micrometer at three points and the results were averaged to obtain an average loss per wafer. The accuracy of measurement is believed to be within $\pm 2.54 \times 10^{-3}$ mm. Inspection of the wafer surfaces was made with a binocular microscope.

It will be seen from the foregoing examples that relatively high polishing rates are obtainable with compositions according to the present invention. Indeed, they are of the same order as those obtained by a widely used commercial polishing composition containing finely divided $ZrO_2$ as a polishing agent.

It has been found that for satisfactory results the polishing composition should have a pH of at least 10 and preferably a pH between 12 and 13. If necessary, the pH can be raised to the desired point by addition of an alkali such as KOH. The employment of sodium metasilicate in the compositions has been found useful in improving the shelf like of the compositions. It appears that the silicate inhibits the deterioration of the compositions. Its effectiveness is shown by the fact that after storage for six weeks, the composition of Example 7 was retested and the average removal rate per wafer was found to be approximately the same as before. The sodium hypochlorite (NaOCl) is a rather strong oxidizing agent which appears to increase the effectiveness of the compositions in polishing. The glycerine, when used, appears to act only as a viscosity and/or drying modifier.

The proportions of the ingredients in polishing compositions according to the present invention may vary. The caltizir product may comprise from about 10% to about 70% of the composition. However, it must be realized that large percentages of the solid polishing agent will increase the viscosity of the composition to such an extent that modification of the polishing process may be necessary. Usually from about 10% to 60% caltizir product will be preferably. The glycerine, when used, preferably constitutes from about 2% to about 10% of the composition. The potassium hydroxide (KOH) content is variable since it is used only in sufficient amount to establish the pH of the composition in the desired range. Normally no more than about 0.55% is sufficient. The sodium hypochlorite (NaOCl) is desirable as an ingredient since it increases the stock removal rate of the composition. It may be used for such purpose in amounts up to about 5% of the composition. The presence of sodium metasilicate is desirable when sodium hypochlorite is employed since it tends to prevent deterioration of such compositions. The percentage of sodium metasilicate in the composition may vary from 0 upwards, though amounts above about 3% to 4% appear to produce no additional benefit. The amount of water will, of course, vary as needed to produce the desired viscosity in the slurry.

Although in the preceding examples polishing compositions comprising caltizirs have been employed in polishing silicon wafers, it will be understood that semiconductive materials such as germanium can also be polished with such compositions. It will also be understood that the pH of compositions according to the present invention can be controlled by alkalis other than potassium hydroxide and that oxidizing agents other than sodium hypochlorite, e.g. sodium chromate, hydrogen peroxide, and potassium permanganate, can be used in preparing polishing compositions containing a caltizir product as a polishing agent. Further, other known polishing agents can be used in a mixture with a caltizir product, if desired.

In the foregoing description and the accompanying claims, percentages are by weight, except as otherwise designated.

I claim:

1. A polishing composition suitable for polishing the surfaces of semi-conductors which comprises an aqueous slurry containing a finely divided calcium-titanium-zirconium-oxygen compound in which the atomic ratio of Ca: Ti: Zr: O is 1:1:3:9, said slurry containing a water-soluble oxidizing agent and having a pH of at least 10.

2. A polishing composition as defined in claim 1 wherein said oxidizing agent is sodium hypochlorite.

3. A polishing composition as defined in claim 2 wherein said composition contains sodium metasilicate.

4. A polishing composition as defined in claim 2 wherein said sodium hypochlorite comprises from about 0.5% to 5.0% of said composition.

5. A polishing composition as defined in claim 2 wherein said sodium hypochlorite comprises about 2% of said composition.

6. A polishing composition as defined in claim 5 wherein a small but stabilizing amount of sodium metasilicate is present.

7. A polishing composition as defined in claim 1 wherein said slurry contains sodium hypochlorite and sodium metasilicate and has a pH of between 12 and 13.

8. A process for polishing the surfaces of semiconductive materials which comprises applying thereto in a polishing operation an aqueous slurry containing a finely divided calcium-titanium-zirconium-oxygen compound in which the atomic ratio of Ca: Ti: Zr: O is 1:1:3:9, said slurry containing a water-soluble oxidizing agent and having a pH of at least 10.

9. A process as set forth in claim 8 in which said oxidizing agent is from about 0.5% to 5.0% of sodium hypochlorite.

* * * * *